Oct. 29, 1940. O. A. STEINMANN 2,219,828
MOTOR VEHICLE
Filed April 8, 1939 2 Sheets-Sheet 2

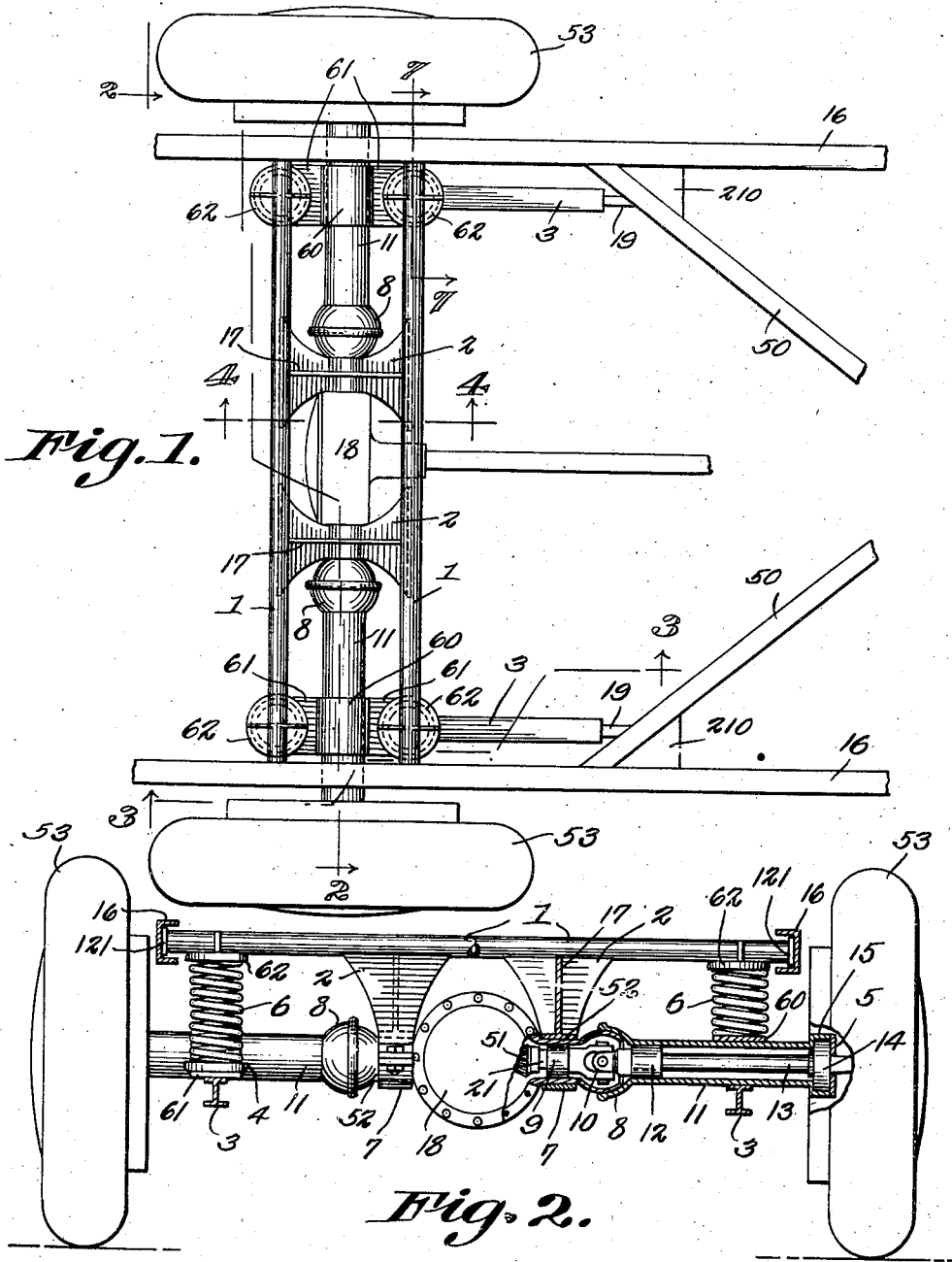

O. A. Steinmann
INVENTOR.
BY
ATTORNEYS.

Patented Oct. 29, 1940

2,219,828

UNITED STATES PATENT OFFICE 2,219,828

MOTOR VEHICLE

Oswald Axel Steinmann, River Grove, Ill.

Application April 8, 1939, Serial No. 266,740

2 Claims. (Cl. 280—124)

This invention aims to provide novel means whereby the movable ends of the rear axle of a motor propelled vehicle may be so mounted that either rear wheel may move upwardly or downwardly, without affecting the other, novel means being supplied whereby the differential casing and the associated, fixed parts will be rigidly assembled with the frame of the vehicle, the construction being such that the movable end portions of the rear axle housing, and the corresponding axle members, although capable of up and down movement, will be held against movement from front to back.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Figure 3:
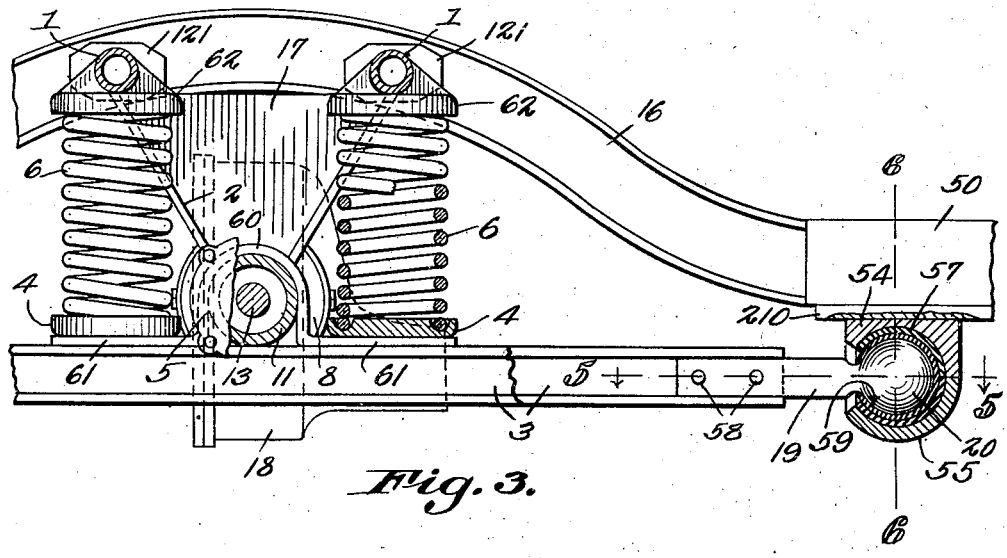
Figures 4, 5:
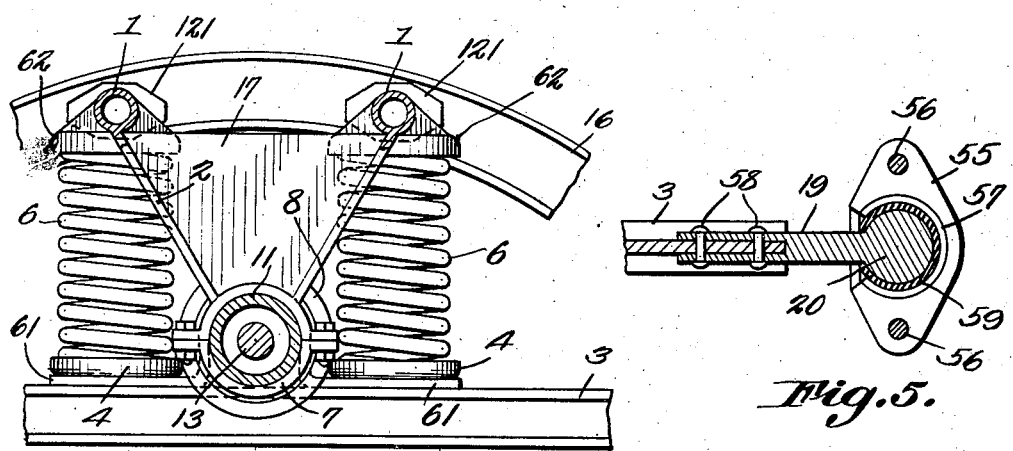
Figures 6, 7:
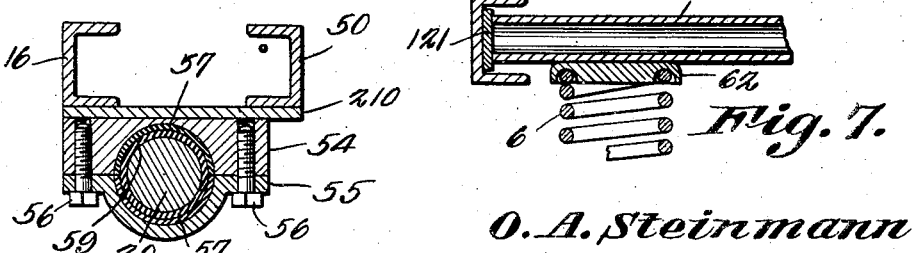

In the accompanying drawings:

Fig. 1 shows in top plan, a device constructed in accordance with the invention;

Fig. 2 is a section on the line 2—2 of Fig. 1;
Fig. 3 is a section on the line 3—3 of Fig. 1;
Fig. 4 is a section on the line 4—4 of Fig. 1;
Fig. 5 is a section on the line 5—5 of Fig. 3;
Fig. 6 is a section on the line 6—6 of Fig. 3;
Fig. 7 is a section on the line 7—7 of Fig. 1.

In the accompanying drawings, there is shown a portion of the framework of an automobile, including chassis bars 16 and forwardly converging braces 50 connected thereto. Parallel tubular transverse supports 1 are provided, and are equipped with terminal flanges 121, secured to the inner surfaces of the chassis bars 16. The supports 1 are connected by transversely spaced depending brackets 2, including connecting plates 17 extended lengthwise of the vehicle. Clamps 7 are secured to the lower ends of the brackets 2.

A differential casing 18 is disposed between the brackets 2 in engagement therewith, and contains a differential mechanism 51. The differential casing 18 is supplied with fixed inner axle housing sections 52, retained on the lower ends of the brackets 2 by the clamps 7.

Movable outer axle housing sections 11 are supplied, the inner ends of the sections 11 being connected to the outer ends of the sections 52 by universal cup joints 8. At the outer ends of the movable axle housing sections 11, there are grease retaining cups 15, closed by caps 5.

Bushings 14 are located in the cups 15. Bushings 12 are mounted in the housing sections 11, near the inner ends thereof. Bearings 9 are mounted in the fixed housing sections 52. Outer axle members 13 are journaled in the bushings 14 and 12, and carry the rear ground wheels 53 of the vehicle. Inner axle members 21 are journaled in the bearings 9 and are connected to the differential mechanism 51. The outer axle members 13 are connected to the inner axle members 21 by universal joints 10 disposed in the universal joint connections 8 of the axle housing.

Gusset plates 210 are secured to the chassis bars 16 and to the braces 50, at the angles defined by those parts. Upper socket members 54 are secured to the gusset plates 210. Lower socket members 55 are attached to the upper socket members 54 by securing elements 56. The cavities of the upper socket members 54 and of the lower socket members 55 contain resilient linings 57, which may be made of rubber.

Parallel radius arms 3 are disposed between the chassis bars 16. The radius arms 3 preferably are I-beams. Forked extensions 19 are supplied, and the forks of the extensions receive the body portions of the radius arms 3, as Fig. 5 will show, the forked portions of the extensions fitting closely between the upper and lower flanges of the radius arms 3, as depicted in Fig. 3. Securing elements 58 connect the forks of the extensions 19 to the bodies of the radius arms 3. At their forward ends, the extensions 19 of the radius arms 3 are provided with spherical heads 20, carrying resilient rubber coverings 59, cooperating with the linings 57 of the socket members 54 and 55, to take up shocks and jars, the heads 20 being mounted to turn in the socket members 54 and 55.

Arched clips 60 extend over the movable housing sections 11, the radius arms 3 being prolonged beneath the said housing sections. The clips 60 have oppositely projecting feet 61, secured to the upper flanges of the radius arms 3. Thus the housing sections 11 are connected to the radius arms 3. Lower seats 4 are secured to the feet 61 of the clips 60. Upper seats 62 are secured to the supports 1. Helical springs 6 are interposed between the seats 4 and 62, there being a set of springs in front of the movable housing sections 11, and a set of springs behind those sections.

Referring especially to Fig. 2, it will be observed that the outer housing sections 11 and parts associated therewith can have free up and down movement, each ground wheel 53 being capable of upward and downward movement, independently of its fellow, the springs 6 affording the necessary cushioning action. Movement of the housing sections 11 and associated parts, longitudinally of the vehicle, is prevented by the radius arms 3.

The device, although simple in construction, will be found thoroughly advantageous for consummating the advantages set forth in the opening portion of this specification.

Having thus described the invention, what is claimed is:

1. In a motor vehicle, a frame including chassis bars, transverse supports secured to the bars and spaced apart longitudinally of the vehicle, depending brackets connecting the supports and spaced apart transversely of the vehicle, a differential casing disposed between the brackets, in engagement therewith, the casing having fixed, tubular, outwardly-extended, inner housing sections, means for securing the inner sections to the lower portions of the brackets, tubular outer housing sections, universal joint connections between the inner and outer housing sections, outwardly of the brackets but in close relation thereto, a differential mechanism in the casing, axles in the inner and outer housing sections and connected to the differential mechanism, means for lending flexibility to the axles, within the universal joint connections, radius arms located between and below the bars in approximately parallel relation thereto, universal joint connections between the forward ends of the radius arms and the frame, compression springs having their upper ends attached to the outer portions of the supports, and clips connecting the outer housing sections to the upper edges of the radius arms the lower ends of the springs exerting pressure on the clips, ahead of and behind the outer axle sections.

2. In a motor vehicle, a frame including chassis bars, transverse supports secured to the bars and spaced apart longitudinally of the vehicle, depending brackets connecting the supports and spaced apart transversely of the vehicle, a differential casing disposed between the brackets, in engagement therewith, the casing having fixed, tubular, outwardly-extended, inner housing sections, means for securing the inner sections to the lower portions of the brackets, tubular outer housing sections, universal joint connections between the inner and outer housing sections, outwardly of the brackets but in close relation thereto, a differential mechanism in the casing, axles in the inner and outer housing sections and connected to the differential mechanism, means for lending flexibility to the axles, within the universal joint connections, radius arms located between and below the bars in approximately parallel relation thereto, universal joint connections between the forward ends of the radius arms and the frame, compression springs having their upper ends attached to the outer portions of the supports, the lower ends of the springs being connected to the radius arms ahead of and behind the outer axle sections, in close relation thereto, and means for connecting the rear ends of the radius arms to the outer housing sections.

OSWALD AXEL STEINMANN.